United States Patent
Chen et al.

(10) Patent No.: US 10,430,934 B2
(45) Date of Patent: Oct. 1, 2019

(54) IMAGE STITCHING METHOD AND IMAGE STITCHING DEVICE

(71) Applicant: VATICS INC., New Taipei (TW)

(72) Inventors: Chih-Wei Chen, New Taipei (TW); Pei-Chen Wu, New Taipei (TW); Yi-An Chen, New Taipei (TW); Der-Chun Cherng, New Taipei (TW)

(73) Assignee: VATICS INC., New Taipei (TW)

( * ) Notice: Subject to any disclaimer, the term of this patent is extended or adjusted under 35 U.S.C. 154(b) by 206 days.

(21) Appl. No.: 15/644,847

(22) Filed: Jul. 10, 2017

(65) Prior Publication Data

US 2018/0308227 A1    Oct. 25, 2018

(30) Foreign Application Priority Data

Apr. 19, 2017 (TW) .............................. 106113066 A

(51) Int. Cl.
*G06T 5/50* (2006.01)
*G06T 3/40* (2006.01)

(52) U.S. Cl.
CPC .............. *G06T 5/50* (2013.01); *G06T 3/4038* (2013.01); *G06T 2200/32* (2013.01)

(58) Field of Classification Search
CPC ...... G06T 5/50; G06T 3/4038; G06T 2200/32
See application file for complete search history.

(56) References Cited

U.S. PATENT DOCUMENTS

2018/0082454 A1* 3/2018 Sahu ..................... G06T 7/90

\* cited by examiner

*Primary Examiner* — Nam D Pham
(74) *Attorney, Agent, or Firm* — Winston Hsu

(57) ABSTRACT

An image stitching method applied to an image stitching device having at least two image capturing units and an operation processing unit includes acquiring at least two images adjacent by each other, detecting an overlapped region of the two adjacent images, compiling statistics of image information about the overlapped region of the two adjacent images, utilizing the image information to compute a compensation function, and adjusting at least one of the two adjacent images according to the image information to make the image information of the two adjacent images into harmony.

16 Claims, 4 Drawing Sheets

IMAGE STITCHING METHOD AND IMAGE STITCHING DEVICE

BACKGROUND OF THE INVENTION

1. Field of the Invention

The present invention relates to an image stitching method and an image stitching device, and more particularly, to an image stitching method and an image stitching device capable of making a stitching image into color harmony.

2. Description of the Prior Art

A panoramic camera utilizes a plurality of camera lenses to capture images at different visual angles, and the said images are stitched up via image stitching technique to form a panoramic image. However, intensity of environmental illumination may be dissimilar at different visual angles and hardware parameters of the camera lenses may be distinct from each other. The hardware parameters can be exposure time, white balance and color feature. As the panoramic camera drives the plurality of camera lenses individually or simultaneously to capture the images with different visual angles, the said images lack for color and intensity harmony, and the panoramic image formed by the said images may have apparent color and/or intensity sectional difference located on an adjacent place of the panoramic image. Thus, design of an image stitching method capable of effectively improving stitching efficacy is an important issue in the related industry.

SUMMARY OF THE INVENTION

The present invention provides an image stitching method and an image stitching device capable of making a stitching image into color harmony for solving above drawbacks.

According to the claimed invention, an image stitching method includes acquiring two images adjacent by each other, detecting an overlapped region of the two adjacent images, compiling statistics of image information about the overlapped region of the two adjacent images, utilizing the image information to compute a compensation factor, and adjusting at least one of the two adjacent images in accordance with the compensation factor to make the image information of the two adjacent images into harmony.

According to the claimed invention, an image stitching device includes at least two image capturing units and an operation processing unit. The at least two image capturing units are adapted to capture two images having adjacent fields of view. The operation processing unit is electrically connected to the image capturing units and adapted to acquire the two images adjacent by each other, to detect an overlapped region of the two adjacent images, to compile statistics of image information about the overlapped region of the two adjacent images, to utilize the image information to compute a compensation factor, and to adjust at least one of the two adjacent images in accordance with the compensation factor to make the image information of the two adjacent images into harmony.

The image stitching method and the related image stitching device of the present invention utilize vision overlapping property of the image capturing units to make the overlapped region of the adjacent images into harmony, parameters of the compensation factor can be computed to compensate one or several images of the adjacent images, so as to effectively overcome image information difference of the image capturing unit effected by individual location or features of its optical elements (such as an image sensor, a lens module or a filter), and to make the stitched panoramic image into intensity and color harmony.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
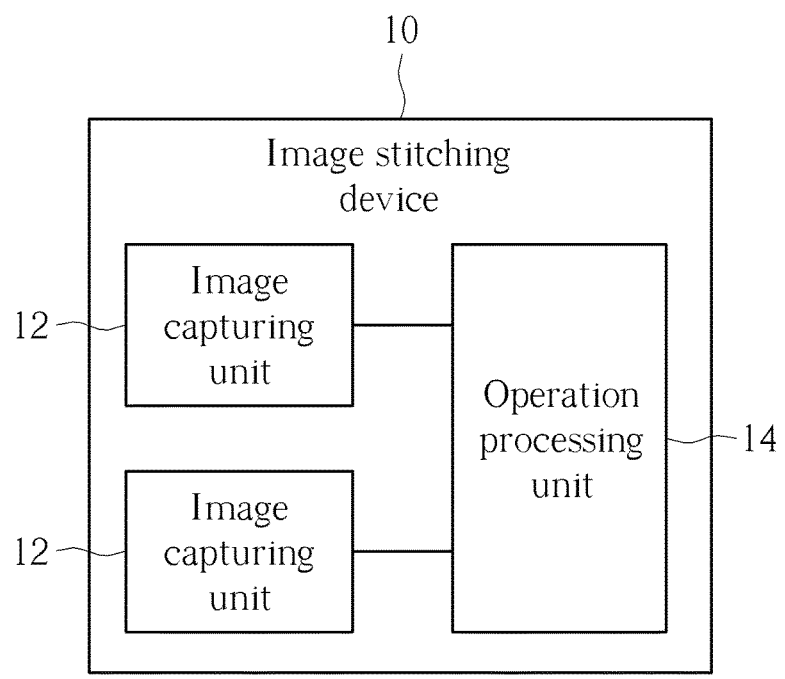
FIG. 1 is a functional block diagram of an image stitching device according to an embodiment of the present invention.
Figure 2:
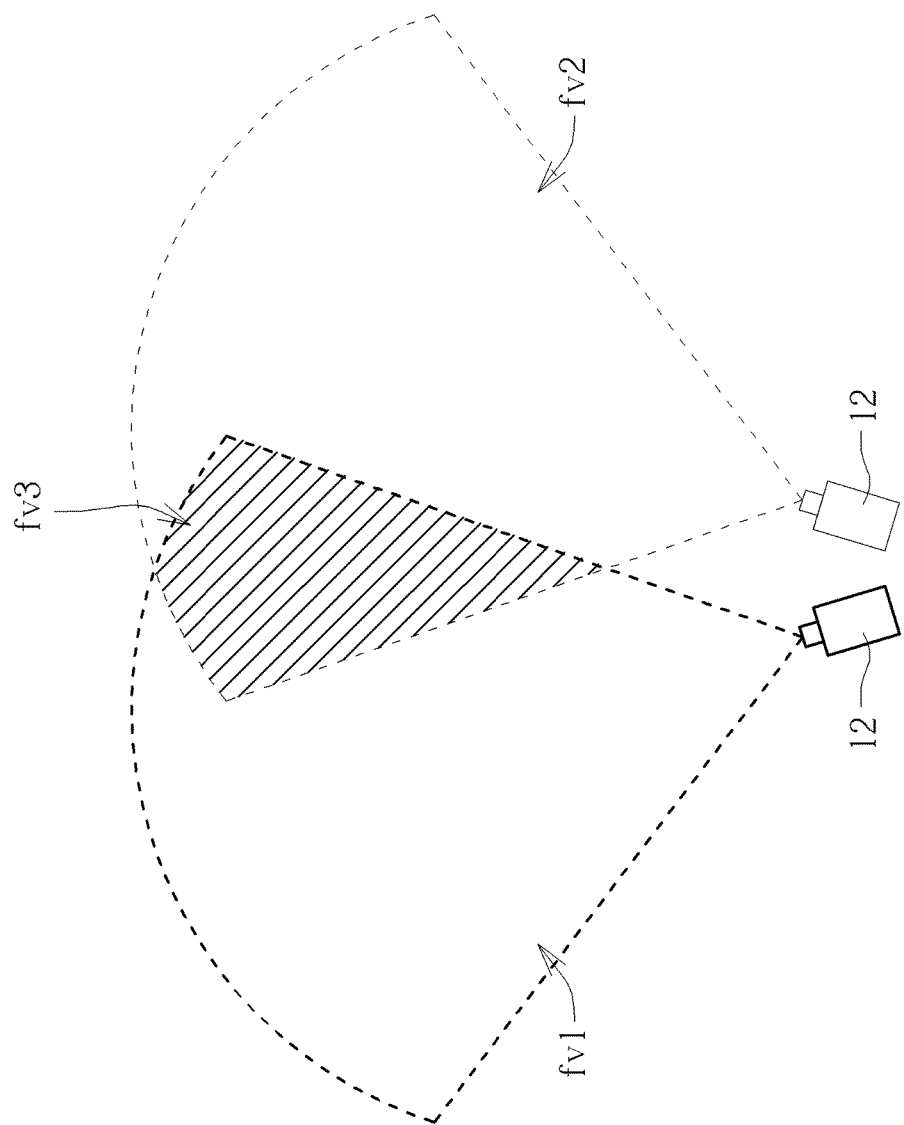
FIG. 2 is a presentation diagram of the image stitching device according to the embodiment of the present invention.

Please refer to FIG. 1 and FIG. 2. FIG. 1 is a functional block diagram of an image stitching device 10 according to an embodiment of the present invention. FIG. 2 is a presentation diagram of the image stitching device 10 according to the embodiment of the present invention. The image stitching device 10 includes a plurality of image capturing units 12 and an operation processing unit 14 electrically connected with each other. The plurality of image capturing units 12 face a monitoring region respectively at different visual angles to acquire a plurality of images I1 and I2 having adjacent fields of view. The operation processing unit 14 can stitch the adjacent images I1 and I2 to form a panoramic image for omnidirectional monitoring and recording. While the images are stitched, the operation processing unit 14 executes an image stitching method of the present invention to prevent the panoramic image from color and/or intensity sectional difference located on an adjacent place.

Figure 3:
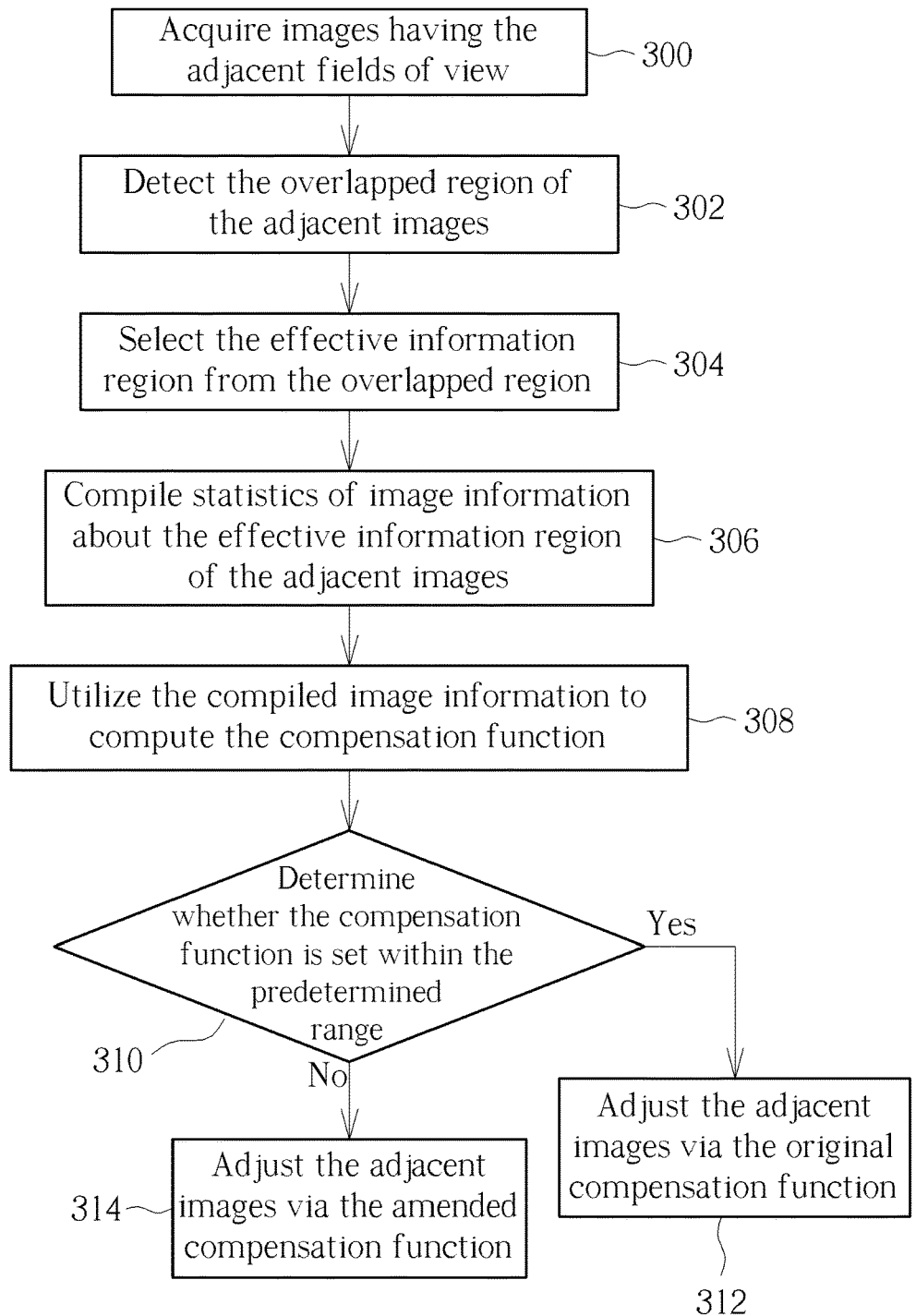
FIG. 3 is a flowchart of the image stitching method according the embodiment of the present invention.
Figure 4:
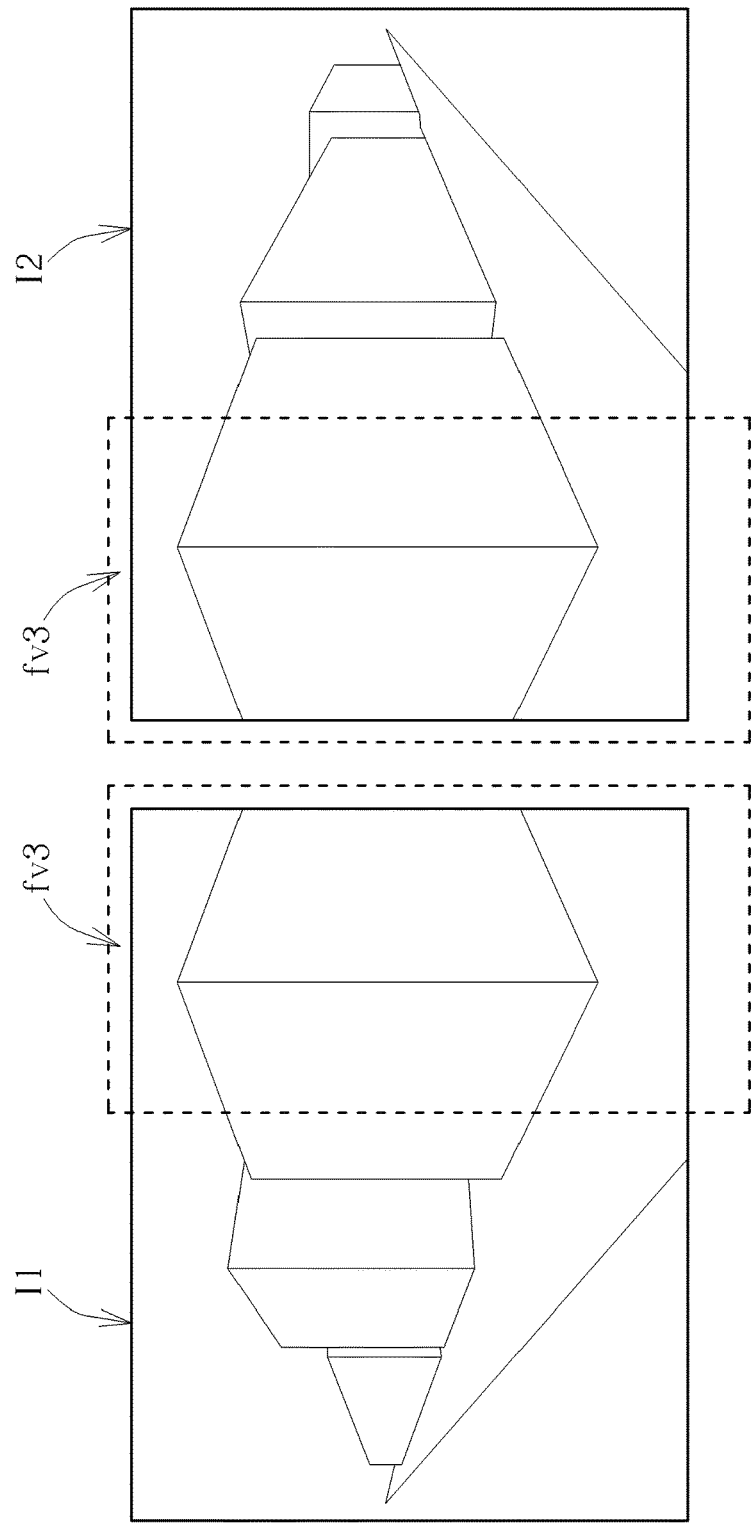
FIG. 4 is a schematic diagram of the adjacent images according to the embodiment of the present invention.

Please refer to FIG. 3 and FIG. 4. FIG. 3 is a flow chart of the image stitching method according to the embodiment of the present invention. FIG. 4 is a schematic diagram of the adjacent images I1 and I2 according to the embodiment of the present invention. The image stitching method illustrated in FIG. 3 is suitable for the image stitching device 10 shown in FIG. 1 and FIG. 2. The image stitching device 10 may have two or more image capturing units 12, an image captured by each image capturing unit 12 is partly overlapped with another image captured by the adjacent image capturing unit 12, as an overlapped region fv3 shown in FIG. 4, and then the adjacent images I1 and I2 can be stitched by the operation processing unit 14. An arrangement of the image capturing units 12 and a stitching queue of the adjacent images are not limited to the above-mentioned embodiment, which depends on actual demand; for example, an aspect ratio of a strap-shaped panoramic image having six images can be 1:6, or an aspect ratio of a rectangular-shaped panoramic image having six images can be 2:3.

While an image stitching function of the image stitching device 10 is actuated, step 300 and step 302 are executed that the operation processing unit 14 acquires two or more images I1 and I2 having the adjacent fields of view from the image capturing unit 12, and detects the overlapped region fv3 of the adjacent images I1 and I2. As shown in FIG. 2, the overlapped region fv3 can be formed between the field of view fv1 of the left-side image capturing unit 12 and the field of view fv2 of the right-side image capturing unit 12. In the possible embodiment of the present invention, the image stitching method can define an entire overlapped frame of the adjacent images as the overlapped region fv3, or select a partial overlapped frame of the adjacent images as the overlapped region fv3. Selection of the partial overlapped frame may be practiced in manual, or may be dynamically practiced via automatic pattern recognition technique which means a specific pattern inside the overlapped frame is recognized to define the overlapped region fv3 accordingly, and an actual application is not limited to the foresaid embodiments. Besides, step 302 can be optionally interpreted as the image stitching method may detect a non-overlapped region of the adjacent images I1 and I2 for a start and then remove the non-overlapped region from the adjacent images I1 and I2, so as to acquire the overlapped region fv3.

Then, step 304 and step 306 are executed to select an effective information region from the overlapped region fv3 and to compile statistics of image information about the effective information region of the two adjacent images I1 and I2. Selection of the effective information region is designed to filter error within the overlapped region fv3 for increasing image stitching accuracy. The effective information region can be selected from the image I1 or I2, or the images I1 and I2 can be both considered to select the effective information region. In addition, the effective information region may be designated from a specific range within the overlapped region fv3 directly, or may be dynamically designated via the pattern recognition technique. The image stitching method can select the effective information region from the overlapped region fv3 through a range having a similar feature, and the similar feature can include, but not be limited to, intensity similarity, color similarity, sharpness similarity and gradient similarity. Accordingly, the image information can be selected from a group consisting of lightness, hue, chroma, and combination thereof. It should be mentioned that step 304 is an optional execution, which means the image stitching method may directly compile statistics of the image information about the overlapped region fv3 of the adjacent images while step 304 is not executed.

Then, step 308 and step 310 are executed to utilize the compiled image information to compute a compensation factor, and to determine whether the compensation factor is set within a predetermined range. As the compensation factor is set within the predetermined range, step 312 is executed to adjust the adjacent images via the original compensation factor; as the compensation factor is set over the predetermined range, step 314 is executed to adjust the adjacent images via an amended compensation factor, and the compensated adjacent images can be used to combine the panoramic image without color sectional difference and/or intensity sectional difference. In the embodiment of the present invention, the compensation factor can be a ratio of a predetermined ideal value to one of the adjacent images, which depends on actual demand. For example, compensation weighting of the compensation factor suitable for the image can be greater than 1.0 while the image information of the image is lower than the predetermined ideal value, and the compensation weighting of the compensation factor suitable for the image can be smaller than 1.0 while the image information of the image is higher than the predetermined ideal value. For preventing the strange stitching image resulted by large modulated amplitude of compensation, the image stitching method preferably amends variation of the compensation factor via step 314 to avoid stitching location between the adjacent images from violent color/intensity difference.

It should be mentioned that compensation parameters of the compensation factor can be defined as hue, saturation, value, lightness, chroma and/or RGB of the image information. While computing the amended weighting of the compensation factor, the image stitching method can choose a part of or all of the foresaid compensation parameters, and utilize linear regression technique, nonlinear regression technique or linear programming technique to compute a mean value, a highest value, a lowest value or any possible computation, so as to find out the amended weighting and the related compensation factor fit in with the compensation parameters. Further, linear compensation technique or nonlinear compensation technique can be applied to adjust at least one of the adjacent images, so as to obviously increase the stitching color and intensity harmony of the adjacent images. The said compensation can be implemented for any color and/or intensity adjustment functions, such like analog gain, digital gain, white balance gain, and color correction matrix.

In conclusion, the image stitching method and the related image stitching device of the present invention utilize vision overlapping property of the image capturing units to make the overlapped region of the adjacent images into harmony, parameters of the compensation factor can be computed to compensate one or several images of the adjacent images, so as to effectively overcome image information difference of the image capturing unit effected by individual location or features of its optical elements (such as an image sensor, a lens module or a filter), and to make the stitched panoramic image into intensity and color harmony.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image stitching method comprising:
   acquiring two images adjacent by each other;
   detecting an overlapped region of the two adjacent images;
   compiling statistics of image information about the overlapped region of the two adjacent images;
   utilizing the image information to compute a compensation factor as a ratio of a predetermined ideal value to one of the two adjacent images; and
   adjusting at least one of the two adjacent images in accordance with the compensation factor to make the image information of the two adjacent images into harmony, wherein the compensation factor comprises a plurality of compensation parameters, the image stitching method optionally sets a mean value, a highest value or a lowest value of the plurality of compensation parameters to be an amended weighting of the compensation factor.

2. The image stitching method of claim 1, further comprising:
   determining whether the compensation factor is set within a predetermined range; and
   utilizing an amended compensation factor to adjust at least one of the two adjacent images while the compensation factor is set over the predetermined range.

3. The image stitching method of claim 1, further comprising:
selecting an effective information region from the overlapped region; and
compiling statistics of the image information about the effective information region in accordance with the two adjacent images respectively.

4. The image stitching method of claim 3, wherein the effective information region is selected from the overlapped region through a range having a similar feature, and the similar feature is at least one of intensity similarity, color similarity, sharpness similarity and gradient similarity.

5. The image stitching method of claim 1, further comprising:
defining an entire overlapped frame or a partial overlapped frame of the two adjacent images as the overlapped region.

6. The image stitching method of claim 1, wherein detecting the overlapped region of the two adjacent images comprises:
detecting a non-overlapped region of the two adjacent images; and
removing the non-overlapped region from the two adjacent images to acquire the overlapped region.

7. The image stitching method of claim 1, wherein the image information is selected from a group consisting of lightness, hue, chroma, and combination thereof.

8. The image stitching method of claim 1, wherein the image stitching method utilizes linear regression technique, nonlinear regression technique or linear programming technique to compute the compensation factor, and further utilizes linear compensation technique or nonlinear compensation technique to adjust at least one of the two adjacent images via the compensation factor.

9. An image stitching device, comprising:
at least two image capturing units adapted to capture two images having adjacent fields of view; and
an operation processing unit electrically connected to the image capturing units and adapted to acquire the two images adjacent by each other, to detect an overlapped region of the two adjacent images, to compile statistics of image information about the overlapped region of the two adjacent images, to utilize the image information to compute a compensation factor as a ratio of a predetermined ideal value to one of the two adjacent images, and to adjust at least one of the two adjacent images in accordance with the compensation factor to make the image information of the two adjacent images into harmony, wherein the compensation factor comprises a plurality of compensation parameters, the image stitching method optionally sets a mean value, a highest value or a lowest value of the plurality of compensation parameters to be an amended weighting of the compensation factor.

10. The image stitching device of claim 9, wherein the operation processing unit is further adapted to determine whether the compensation factor is set within a predetermined range and to utilize an amended compensation factor to adjust at least one of the two adjacent images while the compensation factor is set over the predetermined range.

11. The image stitching device of claim 9, wherein the operation processing unit is further adapted to select an effective information region from the overlapped region and to compile statistics of the image information about the effective information region in accordance with the two adjacent images respectively.

12. The image stitching device of claim 11, wherein the effective information region is selected from the overlapped region through a range having a similar feature, and the similar feature is at least one of intensity similarity, color similarity, sharpness similarity and gradient similarity.

13. The image stitching device of claim 9, wherein the operation processing unit is further adapted to define an entire overlapped frame or a partial overlapped frame of the two adjacent images as the overlapped region.

14. The image stitching device of claim 9, wherein the operation processing unit is further adapted to detect a non-overlapped region of the two adjacent images and to remove the non-overlapped region from the two adjacent images to acquire the overlapped region while detecting the overlapped region of the two adjacent images.

15. The image stitching device of claim 9, wherein the image information is selected from a group consisting of lightness, hue, chroma, and combination thereof.

16. The image stitching device of claim 9, wherein the image stitching method utilizes linear regression technique, nonlinear regression technique or linear programming technique to compute the compensation factor, and further utilizes linear compensation technique or nonlinear compensation technique to adjust at least one of the two adjacent images via the compensation factor.

* * * * *